US010021644B2

(12) United States Patent
Patil et al.

(10) Patent No.: US 10,021,644 B2
(45) Date of Patent: Jul. 10, 2018

(54) NETWORK DISCOVERY

(71) Applicant: QUALCOMM Incorporated, San Diego, CA (US)

(72) Inventors: Abhishek Pramod Patil, San Diego, CA (US); George Cherian, San Diego, CA (US); Alireza Raissinia, Monte Sereno, CA (US); Santosh Paul Abraham, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 114 days.

(21) Appl. No.: 14/918,955

(22) Filed: Oct. 21, 2015

(65) Prior Publication Data

US 2016/0127996 A1 May 5, 2016

Related U.S. Application Data

(60) Provisional application No. 62/072,919, filed on Oct. 30, 2014.

(51) Int. Cl.
*H04W 52/02* (2009.01)
*H04W 48/16* (2009.01)
*H04W 84/12* (2009.01)
*H04W 48/14* (2009.01)
*H04W 88/06* (2009.01)

(52) U.S. Cl.
CPC ....... *H04W 52/0229* (2013.01); *H04W 48/16* (2013.01); *H04W 48/14* (2013.01); *H04W 84/12* (2013.01); *H04W 88/06* (2013.01); *Y02D 70/00* (2018.01); *Y02D 70/142* (2018.01); *Y02D 70/144* (2018.01)

(58) Field of Classification Search
CPC .......................... H04W 52/0229; H04W 84/12
See application file for complete search history.

(56) References Cited

U.S. PATENT DOCUMENTS

2004/0114559 A1\* 6/2004 Wang ................ H04L 29/12216
370/338
2008/0032684 A1\* 2/2008 Yagyu ................... H04W 52/40
455/420

(Continued)

FOREIGN PATENT DOCUMENTS

EP       2806703 A1    11/2014
WO    2013143352 A1   10/2013

(Continued)

OTHER PUBLICATIONS

International Search Report and Written Opinion for International Application No. PCT/US2015/056937, ISA/EPO, dated Jan. 29, 2016, 13 pgs.

*Primary Examiner* — Jamal Javaid
(74) *Attorney, Agent, or Firm* — Qualcomm Incorporated—Toler

(57) ABSTRACT

A method of operation of a mobile device includes tuning a transceiver of the mobile device to communicate using a low-power (e.g., NAN) network and receiving a discovery message via the low-power (e.g., NAN) network. The discovery message indicates one or more network parameters associated with a wireless local area network (WLAN) that is associated with an access point. The method further includes communicating with the access point using the WLAN based on the one or more network parameters.

28 Claims, 4 Drawing Sheets

(56) References Cited

U.S. PATENT DOCUMENTS

| | | | |
|---|---|---|---|
| 2013/0051303 A1 | 2/2013 | Huang et al. | |
| 2013/0176897 A1* | 7/2013 | Wang | H04W 12/06 |
| | | | 370/254 |
| 2013/0237148 A1 | 9/2013 | McCann et al. | |
| 2013/0316705 A1 | 11/2013 | Kneckt et al. | |
| 2014/0022896 A1* | 1/2014 | Yeh | H04W 28/12 |
| | | | 370/230 |
| 2014/0211659 A1 | 7/2014 | Abraham et al. | |
| 2015/0341811 A1* | 11/2015 | Deshpande | H04W 24/08 |
| | | | 370/252 |
| 2015/0351114 A1* | 12/2015 | Wolf | H04W 76/023 |
| | | | 370/330 |

FOREIGN PATENT DOCUMENTS

| | | | |
|---|---|---|---|
| WO | 2013184110 A1 | 12/2013 | |
| WO | WO 2013184110 A1 * | 12/2013 | H04W 36/0066 |

\* cited by examiner

NETWORK DISCOVERY

I. CROSS-REFERENCE TO RELATED APPLICATIONS

This application claims the benefit of U.S. Provisional Patent Application No. 62/072,919, filed Oct. 30, 2014 and entitled "POWER-EFFICIENT NETWORK DISCOVERY," the contents of which are incorporated by reference herein in their entirety.

II. FIELD

The present disclosure is generally related to electronic devices and more particularly to communication techniques for electronic devices, such as network discovery for electronic devices.

III. DESCRIPTION OF RELATED ART

Advances in technology have resulted in smaller and more powerful electronic devices. Electronic devices include mobile devices, such as wireless telephones, personal digital assistants (PDAs), and paging devices. Mobile devices may be small, lightweight, and easily carried by users. Wireless telephones, such as cellular telephones, can communicate voice and data packets over wireless networks. Further, many wireless telephones include other types of devices that are incorporated therein. For example, a wireless telephone can also include a digital still camera, a digital video camera, a digital recorder, and an audio file player. Further, wireless telephones can process executable instructions, such as to initiate communications with other devices within a wireless network.

To communicate within the wireless network, a mobile device may perform a setup procedure, such as a network discovery procedure. For example, the mobile device may transmit one or more probe messages. If an access point is within range of the mobile device, the access point may receive the one or more probe messages and may send information to the mobile device (e.g., information regarding the wireless network) to facilitate the setup procedure. In some cases, the mobile device may send additional messages to the access point to obtain additional information regarding the network (e.g., regarding a back-end of the network), such as by sending access network query protocol (ANQP) messages to the access point. Exchanging messages during the setup procedure consumes power (e.g., battery power of the mobile device), uses airtime (which could be used for sending data) and uses network resources (e.g., one or more channels of the wireless network). Further, such management/setup messages may be sent using a low data rate and therefore may have a high airtime occupancy, which may decrease the airtime available for sending data frames (usually at a much higher rate), thus affecting the overall system throughput.

IV. SUMMARY

A mobile device may initiate a setup procedure with an access point in response to receiving a message. The message may be received via a low-power network, such as via a neighborhood area network (NAN) or using a Bluetooth® network (Bluetooth® is a registered trademark of Bluetooth Special Interest Group (SIG), Inc.). In this case, the mobile device may receive a message (via the low-power network) that "advertises" a network associated with the access point, such as a wireless local area network (WLAN) associated with the access point. The message may indicate a network channel, a target beacon transmit time (TBTT), or a service set identification (SSID), as illustrative examples. The message may be received from the access point or from another mobile device, as illustrative examples.

In response to receiving the message via the low-power network, the mobile device may communicate with the access point based on the message. For example, the mobile device may communicate with the access point using a network channel indicated by the message, such as by tuning a transceiver to send messages to the access point and/or to receive messages from the access point. Alternatively or in addition, the mobile device may operate based on a TBTT indicated by one or more network parameters of the received advertising message. For example, the mobile device may wake up from a sleep mode of operation during the TBTT to receive a beacon from the access point. The beacon may indicate one or more characteristics of the WLAN (e.g., the network channel), and the mobile device may communicate with the access point based on the one or more characteristics (e.g., using the network channel). In some cases, an advertising message may be received directly from an access point by the mobile device. Alternatively or in addition, a mobile device of a low-power network, such as a NAN, may transmit an advertising message to another mobile device of the low-power network, (e.g., to "republish" the message for an access point to advertise the access point to devices of the low-power network).

Using the low-power network to "advertise" the network may reduce power consumption of the mobile device and the access point as compared to communication of probe messages and other messages, such as access network query protocol (ANQP) messages between the mobile device and the access point, thus improving performance of network devices. Further, because probe messages and ANQP messages may be sent using a low data rate, reducing or avoiding communication of probe messages and ANQP messages may free airtime of the WLAN for data communications (which may be sent using a higher data rate than probe messages and ANQP messages). Accordingly, network operation may be improved by reducing management and setup overhead (e.g., low data rate messages, such as probe messages and ANQP messages) in order to increase airtime available to higher data rate communications (e.g., data communications).

Thus, an access point may "advertise" one or more network parameters associated with a network (e.g., a WLAN) using a low-power technique (e.g., using a channel associated with a NAN). The mobile device may be configured to scan the NAN to obtain a message including parameters from access points. For example, to identify an access point that is within range of the mobile device, the mobile device may tune a transceiver to the NAN channel (e.g., a receive frequency associated with the NAN) to receive information using the NAN.

In some implementations, the mobile device may disable WLAN network discovery operations, such as probing operations during which the mobile device sends probe requests on each channel to find an access point and/or passive network discovery operations where the mobile device dwells on each channel to catch beacons from access points operating on that channel. In a NAN implementation, mobile devices need to monitor only the NAN channel (e.g., channel 6 in a 2.4 gigahertz NAN implementation) during a discovery window (DW) associated with the NAN. Thus, use of a NAN may utilize channel switching and transceiver operation only during the DW period. In a Bluetooth® implementation, the mobile device can turn off a Wi-Fi radio completely and utilize a Bluetooth® radio (which is low power compared to Wi-Fi at the expense of shorter range).

Devices participating in the NAN may periodically or occasionally wake up (if asleep) during a discovery window associated with the NAN to detect one or more messages that advertise network parameters. For example, time intervals in the NAN may be divided into timer units (TU), and devices participating in the NAN may wake up during a 16 TU discovery window that occurs every 500 TU (or roughly each half-second). An access point may use the NAN to advertise a network channel associated with the WLAN, a TBTT associated with the WLAN, or a SSID associated with the WLAN.

In a particular example, the access point may advertise services using an information element associated with an Institute of Electrical and Electronics Engineers (IEEE) 802.11 communication standard, such as using an IEEE 802.11ai fast initial link setup (FILS) information element. The IEEE 802.11 FILS information element may include information regarding a security domain of the access point or an Internet Protocol (IP) subnet of the access point, as illustrative examples. In another example, the access point may utilize a NAN WLAN connectivity attribute to provide information regarding the WLAN. The NAN WLAN connectivity attribute may carry additional fields to provide more information regarding the access point.

Accordingly, a client device interested in joining or roaming to a hotspot network need to scan only the NAN channel to discover surrounding access points. The advertisements sent using the NAN may enable a mobile device to make an informed decision regarding network selection (e.g., to select an access point supported by a particular service provider associated with the mobile device). For example, the IEEE 802.11ai FILS information element may indicate that the access point and the mobile device are associated with a common security domain and/or a common IP subnet. In this case, the 802.11ai FILS information element may assist the mobile device in selecting an access point in the same security domain and/or IP subnet.

The access point may use the NAN to provide additional ANQP parameters to a mobile device. In some implementations, this may be performed using NAN follow-up messages by which a publisher and a subscriber exchange additional information related to a service. In some implementation, FILS ANQP elements (e.g., Query AP-List, AP-List Response, etc.) may be "piggybacked" over NAN messages. FILS ANQP elements may provide an efficient way to query multiple ANQP parameters with a single information element, thus reducing the number of ANQP messages.

Compared to legacy scanning techniques, NAN based network discovery involves very little messaging overhead, less channel switching overhead, and operates in a low-power mode. For example, a mobile device may monitor only the NAN channel during each discovery window occurring each 500 TU. The scheme is beneficial in scenarios where wireless fidelity (Wi-Fi) deployment may be distributed widely (or spread out). In such scenarios, client devices may consume battery staying awake and switching channels for legacy scanning while the clients are out of range of Wi-Fi coverage. Using a NAN, the time spent in discovery is very short (16 TU) and is confined to only the NAN channel during the discovery window (each 500 TU).

In a particular example, a method of operation of a mobile device includes tuning a transceiver of the mobile device to communicate using a low-power network and receiving a discovery message via the low-power network. The discovery message indicates one or more network parameters associated with a wireless local area network (WLAN) that is associated with an access point. The method further includes communicating with the access point using the WLAN based on the one or more network parameters.

In another example, an apparatus includes a memory storing instructions and a processor coupled to the memory. The processor is configured to execute the instructions to initiate or control operations. The operations include tuning a transceiver to communicate using a low-power network and receiving a discovery message via the low-power network. The discovery message indicates one or more network parameters associated with a wireless local area network (WLAN) that is associated with an access point. The operations further include communicating with the access point using the WLAN based on the one or more network parameters.

In another example, a method of operation of an access point includes transmitting a message via a low-power network. The message indicates one or more network parameters associated with a wireless local area network (WLAN) that is associated with the access point. The method may further include performing a setup procedure with a mobile device based on the one or more network parameter, and after performing the setup procedure with the mobile device, performing one or more data communications with the mobile device using the WLAN.

In another example, an apparatus includes a memory storing instructions and a processor coupled to the memory. The processor is configured to execute the instructions to initiate or control operations. The operations include transmitting a message via a low-power network. The message indicates one or more network parameters associated with a wireless local area network (WLAN). The operations further include performing a setup procedure with a mobile device based on the one or more network parameters and performing one or more data communications with the mobile device using the WLAN after performing the setup procedure with the mobile device.

One particular advantage provided by at least one of the disclosed examples is that a mobile device consumes less power using a low-power network (e.g., by passively scanning the low-power network for network information) as compared to other techniques in which a mobile device "actively" scans for network parameters and other discovery information. Other aspects, advantages, and features of the present disclosure will become apparent after review of the entire application, including the following sections: Brief Description of the Drawings, Detailed Description, and the Claims.

V. BRIEF DESCRIPTION OF THE DRAWINGS

VI. DETAILED DESCRIPTION

Illustrative examples are described below with reference to the drawings. In the description and the drawings, common features are designated by common reference numbers for convenience.

Figure 1:
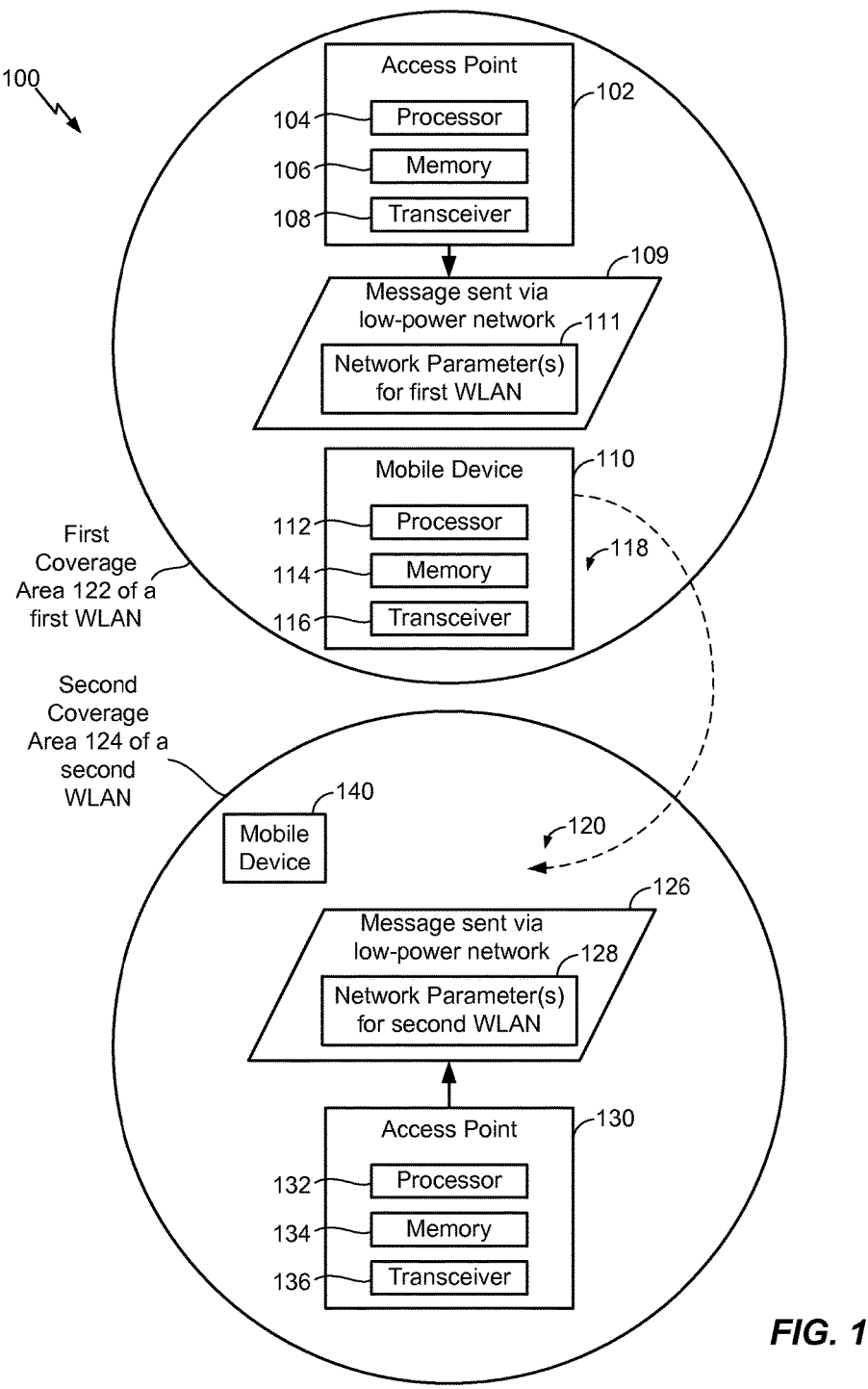
FIG. 1 is a block diagram of a particular illustrative example of a communication system.

Referring to FIG. 1, a particular illustrative example of a communication system is depicted and generally designated 100. The communication system 100 may include one or more access points, such as an access point 102 and an access point 130. The communication system 100 may further include one or more mobile devices, such as a mobile device 110 and a mobile device 140. The communication system 100 may operate in accordance with a communication protocol, such as one or more Institute of Electrical and Electronics Engineers (IEEE) 802.11 communication protocols (e.g., an IEEE 802.11u communication protocol). Alternatively or in addition, the communication system 100 may operate in accordance with one or more Wi-Fi Alliance communication protocols, such as a Hotspot 2.0 communication protocol (also referred to as HS2 and Wi-Fi Certified Passpoint).

The access point 102 may include a processor 104, a memory 106, and a transceiver 108 (or a transmitter and receiver). The memory 106 may store instructions that are executable by the processor 104. The access point 102 may be associated with a first wireless local area network (WLAN), such as a "hotspot" network. The first WLAN may be associated with a first coverage area 122.

The mobile device 110 may include a processor 112, a memory 114, and a transceiver 116 (or a transmitter and receiver). The memory 114 may store instructions that are executable by the processor 112.

The access point 130 may include a processor 132, a memory 134, and a transceiver 136 (or a transmitter and receiver). The memory 134 may store instructions that are executable by the processor 132. The access point 130 may be associated with a second wireless local area network (WLAN), such as a second "hotspot" network. The second WLAN may be associated with a second coverage area 124.

In operation, the mobile device 110 may identify (or attempt to identify) an access point with which to communicate (e.g., to enable data communications, such as Internet communications). For example, if the mobile device 110 is not currently associated with any access point, the mobile device 110 may "listen" for one or more discovery messages from an access point. In accordance with the present disclosure, the mobile device 110 may use a low-power network to detect a message 109. The message 109 may indicate one or more network parameters 111 associated with the first WLAN.

To receive messages using a low-power network, the mobile device 110 may tune the transceiver 116 (or a receiver of the transceiver 116) to receive messages using the low-power network (e.g., to scan for one or more messages advertising one or more access points). For example, the mobile device 110 may adjust a receive frequency of the transceiver 116 from a WLAN receive frequency to a NAN receive frequency or to a Bluetooth® receive frequency (Bluetooth® is a registered trademark of Bluetooth Special Interest Group (SIG), Inc.). As illustrative examples, the mobile device 110 may tune the transceiver 116 to receive messages using a channel specified by a communication protocol, such as Channel 6 of a 2.4 gigahertz (GHz) NAN network or Channel 44 or 149 (depending on local regulations) of a 5 GHZ NAN network. It is noted that in other implementations, the mobile device 110 may use multiple transceivers instead of a single transceiver. In this case, another transceiver of the mobile device 110 (other than the transceiver 116) may be tuned to receive messages using the low-power network.

The mobile device 110 may receive a message 109 from the access point 102 sent using the low-power network. The message 109 may indicate one or more network parameters 111 associated with the first WLAN. To illustrate, the access point 102 may broadcast (or "publish") the message 109 to "advertise" the first WLAN to mobile devices, such as the mobile device 110. The access point 102 may correspond to a provider (or "advertiser") of a service (e.g., the first WLAN), and the mobile device may correspond to a subscriber of the service. The one or more network parameters 111 may include a network channel (e.g., uplink frequency and/or downlink frequency) associated with the first WLAN, a target beacon transmit time (TBTT) associated with the first WLAN, a service set identification (SSID) associated with the first WLAN, or a combination thereof, as illustrative examples.

In some implementations, the mobile device 110 may selectively enable reception of messages, such as the message 109. For example, input may be received at the mobile device 110 from a user of the mobile device 110, the input indicating that the mobile device 110 is to receive (e.g., search for) messages, such as the message 109. In a particular example, an operating system of the mobile device 110 may present the user an option (e.g., a network setting or a "switch" presented via a graphical user interface) to search for networks, such as a NAN or a "free" network (e.g., a "free" Wi-Fi network). For example, the "switch" may include a checkbox presented via the graphical user interface. The switch may be activated (or enabled) by the user to enable identification of one or more Wi-Fi networks by "searching" one or more low-power networks (e.g., a NAN, a Bluetooth® network, or a Bluetooth® low power network) for information related to the one or more Wi-Fi networks. If the "switch" is activated, the mobile device 110 may use a low-power network to attempt to find a Wi-Fi network, such as by scanning a NAN channel, by joining a nearby NAN cluster (if it exists), or by receiving one or more service discovery messages that indicate a Wi-Fi network that is within range of the mobile device 110.

In some cases, the mobile device 110 may perform a low-power search for Wi-Fi networks. For example, the mobile device 110 may perform a search for Wi-Fi networks using low-power networks (e.g., instead of searching Wi-Fi channels to detect Wi-Fi networks) in accordance with a low-power mode of operation. In an illustrative example, the mobile device 110 may operate according to the low-power mode (using low-power networks instead of Wi-Fi networks to search for Wi-Fi networks) in response to a battery charge of the mobile device 110 being less than a threshold. The mobile device 110 may operate according to a "standard" mode that uses Wi-Fi-based searches in response to the battery charge being greater than or equal to the threshold (or in response to the mobile device 110 being connected to an external power supply, such as a mains outlet or a computing device). While operating in the "standard" mode, Wi-Fi-based searches may be performed alternatively or in addition to searches using low-power networks. Further, it is noted that a transition to or from the low-power mode and the "standard" mode may be initiated by a user of the mobile device 110 (e.g., based on input received via a graphical user interface of the mobile device 110) or may be initiated automatically by the mobile device 110 (e.g., based on a battery charge of the mobile device 110). In some implementations, the transition may be initiated automatically by the mobile device 110 by default (e.g., based on a battery charge of the mobile device 110) unless the user "overrides" the default (e.g., by specifying that the mobile device 110 is to perform searches using only Wi-Fi channels or using only low-power networks).

To further illustrate, input received from the user may indicate one of a first mode (where the mobile device 110 searches for networks) or a second mode (where the mobile device does not search for networks). In response to selection of the first mode, the mobile device 110 may tune to a particular channel (e.g., a predetermined channel) to detect one or more messages advertising a network, such as the message 109 advertising the first WLAN. In some cases, a certain network (or network type) may be associated with higher priority (or may be "preferred") as compared to one or more other networks or network types. For example, the mobile device 110 may "prefer" networks operated by a service provider associated with the mobile device 110.

In some examples, a message sent by an access point may include a service identification (ID) that advertises a WLAN (e.g., a Wi-Fi network) using a low-power network, such as a NAN. For example, the message 109 may include a service ID associated with the access point 102 (e.g., a service ID that advertises a Wi-Fi network of the access point 102). The service ID may be "well known" to devices. To illustrate, in some cases, the WLAN complies with a particular communication protocol (e.g., a Wi-Fi Alliance communication protocol or an IEEE 802.11 communication protocol), and the particular communication protocol specifies the service ID (e.g., either for particular access points, or for a group of access points, such as a group of access points that provide Wi-Fi connectivity).

In a particular implementation, the message may include a service ID field that includes the "well known" service ID. The "well known" service ID may be a particular value, or a hash of a particular value, that is known to the devices of the network, such as a value defined by a particular vendor, a value defined by a particular network provider, or a value defined by a particular wireless communication protocol. In a particular implementation, the service ID field may be included in a service descriptor attribute (SDA). In addition to the service ID field, the message may include additional fields that indicate one or more network parameters, such as the one or more network parameters 111 (e.g., a particular SSID of the access point 102 or a security domain of the access point 102). To further illustrate, multiple access points may transmit messages having the same service ID and different network parameters. For example, a first access point that provides a first network may transmit a first message including the "well known" service ID and a first set of network parameters associated with the first network, and a second access point that provides a second network may transmit a second message including the "well-known" service ID and a second set of network parameters associated with the second network. In a particular implementation, an access point may provide the service ID in a NAN service discovery message sent using a NAN. In other implementations, a device may provide the service ID in a different message, such as a message used with Bluetooth® communications or Bluetooth® low-energy communications (Bluetooth® is a registered trademark of Bluetooth Special Interest Group (SIG), Inc.).

A subscriber (e.g., a mobile device, such as the mobile device 110) may search for the service ID (e.g., during operation according to the first mode where the mobile device 110 searches for networks). The subscriber may actively search for the service ID (e.g., by sending one or more service discovery subscription messages indicating the well-known service ID using a low-power network, such as a NAN) to detect an access point associated with the service ID. Alternatively or in addition, the subscriber may passively search for an access point associated with the service ID, such as by receiving the message 109, where the message 109 indicates the service ID.

In some cases, a mobile device may "republish" the message 109 to further advertise the first WLAN. For example, if the mobile device 140 is within range of the access point 102, the mobile device 140 may receive the message 109 and may republish the message 109 to advertise the first WLAN (e.g., to "extend" the range of the message 109 so that the message 109 is received by more devices). In this example, the mobile device 110 may receive the message 109 from the mobile device 140. Thus, although the low-power network may have a smaller coverage area than the first WLAN (e.g., due to lower power of transmitted signals), a device that is within the second coverage area 124 but that is outside the low-power network coverage area may detect the first WLAN by receiving the message 109 from the mobile device 140.

In other cases, republishing of the message 109 in the communication system 100 can be avoided (e.g., suppressed). For example, avoiding republishing of the message 109 may avoid instances of the communication system 100 being "flooded" with messages (e.g., service discovery messages or other advertisements). In this example, the access point 102 may send the message 109, and the message 109 may include a "do not republish" indication that indicates the message 109 is not to be republished.

In certain implementations, the mobile device 110 is configured to receive messages (e.g., the message 109) during one or more intervals (or windows) associated with a communication protocol. For example, the mobile device 110 may receive the message 109 during a discovery window associated with a communication protocol. To illustrate, time intervals in a NAN may be divided into timer units (TU), where one TU is equal to 1024 microseconds. Devices participating in the NAN (e.g., the mobile device 110) may wake up during a 16 TU discovery window that occurs every 500 TU (or approximately each half-second). In this example, the mobile device 110 may periodically or occasionally wake up (if asleep) during the discovery window associated with the NAN to receive one or more messages, such as the message 109.

In response to receiving the message 109, the mobile device 110 may use the one or more network parameters 111 to determine whether to communicate with the access point 102 (e.g., whether to perform a link setup procedure with the access point 102). For example, the mobile device 110 may be configured to communicate only with certain access points, such as access points affiliated with a common network or service provider of the mobile device 110. In this example, the mobile device 110 may determine based on the one or more network parameters 111 whether the mobile device 110 and the access point 102 are associated with a common network or service provider. For example, the one or more network parameters 111 may indicate a security domain associated with the access point 102 and/or an IP subnet associated with the access point 102. In some implementations, the mobile device 110 may be configured to compare the security domain and/or the IP subnet with an indication of a security domain and/or an IP subnet of the mobile device 110 (e.g., to determine whether the security domains and/or IP subnets match).

In a particular example, the message 109 is sent via the low-power network in accordance with an IEEE 802.11ai technique. For example, the one or more network parameters 111 may include an IEEE 802.11ai FILS information element (IE). The IEEE 802.11ai FILS information element may indicate a security domain associated with the access point 102, an Internet Protocol (IP) address type associated with the access point 102, or an IP subnet associated with the access point 102. Depending on the particular implementation, the IEEE 802.11ai FILS information element may indicate multiple security domains (e.g., six security domains, or another number of security domains). In a particular embodiment, the IEEE 802.11ai FILS information element includes a two-byte hash of a security domain. It is noted that in this example, an IEEE 802.11ai FILS information element may be sent via a low-power network (e.g., a NAN, a Bluetooth® (Bluetooth is a registered trademark of Bluetooth Special Interest Group (SIG), Inc.) network, or a Bluetooth low-energy (BLE) network) instead of using a WLAN (e.g., instead of including the IEEE 802.11ai FILS information element in a beacon or in a probe response that is sent using the first WLAN associated with the access point 102).

In a particular embodiment, the mobile device 110 may use an indication of a security domain included in the one or more network parameters 111 or an indication of an IP subnet included in the one or more network parameters 111 to determine which of multiple access points with which to communicate. To illustrate, if the mobile device 110 receives another discovery message including information related to another access point (not shown in FIG. 1) in addition to receiving the message 109, the mobile device 110 may compare IP subnets indicated by the message 109 and the other message to an IP subnet associated with the access point 102. In this example, if the IP subnet of the access point 102 matches the IP subnet of the access point 102, the mobile device 110 may "prefer" to communicate with the access point 102 instead of the other access point, since for example the mobile device 110 may be able to avoid obtaining a new Internet Protocol (IP) address in the case of a common IP subnet (e.g., by selecting the access point 102 for communications instead of selecting the other access point).

In some implementations, the low-power network is a NAN, and the message 109 has a NAN format. For example, the message 109 may be a NAN frame having a NAN frame format (e.g., a specified number of fields, types of the fields, and lengths of the fields). In a particular embodiment, the message 109 is a NAN frame that includes connectivity information (in addition to service information typically advertised by a NAN frame). In this example, the message 109 may include a NAN WLAN connectivity attribute that indicates the one or more network parameters 111. A NAN frame may include a device role field. The device role field may specify if a device sending the message 109 is the publisher of the message 109. For example, the device role field may include a first value (e.g., "1") if the device sending the message 109 is the publisher of the message 109 (e.g., if the access point 102 sends the message 109). The device role field may include a second value (e.g., "0") if another device sends the message 109 (e.g., if the mobile device 140 republishes the message 109, or if another access point republishes the message 109).

In some implementations, the message 109 is a public action frame, such as a service discovery frame. A public action frame may be sent between devices prior to an association procedure between the devices or may be sent between devices that are not associated with a common basic service set (BSS). If the message 109 is a public action frame, the one or more network parameters 111 may be included in or appended to the public action frame, such as in a further discovery attribute field of the public action frame.

The one or more network parameters 111 may include one or more access network query protocol (ANQP) parameters. Although ANQP parameters are typically transmitted in response to a query from a mobile device, the access point 102 may advertise (or broadcast) the one or more ANQP parameters using the message 109, which may enable the mobile device 110 to avoid sending requests for the one or more ANQP parameters. An example sequence of operations within a typical NAN is provided for illustration and context. In some NAN scenarios, an access point may advertise services using the NAN by publishing information during a discovery window (DW) (e.g., by sending a discovery message during the DW via the NAN). A client device may discover the access point by detecting the discovery message. The client device may use information of the discovery message to determine whether to communicate with the access point (e.g., to determine whether to "subscribe" to one or more services of the access point). If the client device determines to communicate with the access point, the client device may send a subscribe message to the access point. One or more additional follow-up messages may be exchanged between the access point and the client device (e.g., query and response messages) to communicate additional information between the access point and the client device. To illustrate, the client device may send an ANQP Query List element (as specified in IEEE 802.11-2012 section 8.4.4.2) to the access point, and the access point may respond with a Capabilities List ANQP element (as specified in IEEE 802.11-2012 section 8.4.4.3). In some other implementations, the client device may send a Query AP-List ANQP element (as specified in in IEEE 802.11ai), and the access point may respond with an AP-List Response ANQP element (as specified in IEEE 802.11ai).

In connection with the present disclosure, one or more ANQP parameters may be advertised by the access point 102 in response to receiving a query from the mobile device 110 (after the mobile device 110 receives the message 109). For example, the mobile device 110 may send a NAN follow-up message to the access point 102 in response to receiving the message 109 in order to obtain additional information regarding the first WLAN. An example of a NAN follow-up message is a request for additional service information sent from a "subscriber" of the service to a "publisher" of the service (e.g., from the mobile device 110 to the access point 102) in response to receiving a service discovery message (e.g., in response to receiving the message 109). The access point 102 may respond to the NAN follow-up message by sending a NAN follow-up response to the mobile device 110. The NAN follow-up response may indicate information identified by the NAN follow-up message.

In some implementations, one or more IEEE 802.11ai FILS ANQP elements may be "piggybacked" to a NAN message (e.g., a NAN publish message, a NAN subscribe message, or a NAN follow-up message). For example, one or more IEEE 802.11ai FILS ANQP query elements may be piggybacked to a NAN follow-up message sent from the mobile device 110 to the access point 102. As another example, one or more IEEE 802.11ai FILS ANQP response elements may be piggybacked to a NAN follow-up response sent from the access point 102 to the mobile device 110 in response to the NAN follow-up message. In some cases, the message 109 is a NAN message, and the one or more network parameters 111 include one or more IEEE 802.11ai FILS ANQP elements.

Although certain examples have been described with reference to a NAN, it should be appreciated that another network or communication technique may be selected for transmission of the message 109. For example, the access point 102 may send the message 109 using a Bluetooth® (Bluetooth is a registered trademark of Bluetooth Special Interest Group (SIG), Inc.) network, such as using a Bluetooth® channel (e.g., communication frequency), a frame format associated with a Bluetooth® communication technique, and/or using a Bluetooth® low energy (Bluetooth LE) communication technique. In this case, the message 109 may be a Bluetooth® packet. Further, it is noted that in such an implementation the mobile device 110 and the access point 102 may include Bluetooth® transceivers to enable Bluetooth® communication. In this example, the mobile device 110 may disable the transceiver 116 (or put the transceiver 116 in a low-power state) while the mobile device 110 scans for messages using the Bluetooth® transceiver. For example, the mobile device 110 may disable the transceiver 116 (or put the transceiver 116 in a low-power state) in response to leaving the first coverage area 122.

The mobile device 110 may determine based on the one or more network parameters 111 whether to communicate with the access point 102. If the mobile device 110 determines not to communicate with the access point 102, the mobile device 110 may scan for one or more other access points. For example, the mobile device 110 may continue operating the transceiver 116 using a receive frequency associated with either a NAN or a Bluetooth® network to attempt to identify one or more other access points within range of the mobile device 110.

If the mobile device 110 determines to communicate with the access point 102, the mobile device 110 may initiate a setup procedure with the access point 102. For example, the setup procedure may be an IEEE 802.11ai FILS setup procedure. The setup procedure may include authentication operations and/or association operations. The setup procedure may establish data connectivity between the mobile device 110 and the access point 102. For example, after completing the setup procedure, the mobile device 110 may use the first WLAN to access the Internet (e.g., to download or upload data) while the mobile device 110 is within the first coverage area 122. In certain implementations, the mobile device 110 may store (e.g., cache) information regarding the access point 102. For example, the mobile device 110 may store an indication of an IP subnet associated with the access point 102 or other information related to the access point 102.

In some cases, the mobile device 110 may initiate a "roaming" mode in which the mobile device 110 is in communication with an access point (e.g., the access point 102) and in which the mobile device 110 scans for another access point (e.g., the access point 130). In this case, the mobile device 110 may scan for another access point to improve quality of communications (e.g., to improve signal strength). In some cases, a roaming mode may be initiated in response to a user of the mobile device 110 leaving the first coverage area 122. If the mobile device 110 leaves the first coverage area 122, the mobile device 110 may become out of range of the first WLAN. For example, if a user of the mobile device 110 leaves the first coverage area 122, the mobile device 110 may terminate communications with the access point 102. As an example, the user of the mobile device 110 may move from a location 118 to a location 120 (and from the first coverage area 122 to the second coverage area 124).

In accordance with the present disclosure, the mobile device 110 may use a low-power network to identify (or "discover") access points. As used herein, a "low-power network" may refer to a network (and/or a communication technique) that is associated with a lower power consumption by the mobile device 110 as compared to a WLAN (e.g., the first WLAN or the second WLAN). An example of a low-power network is a neighborhood area network (NAN) (also referred to as a neighborhood-aware network or a near-me area network). For example, the mobile devices 110, 140 may communicate using a NAN, which may be associated with lower power consumption by the mobile devices 110, 140 as compared to communicating via a WLAN. Another example of a low-power network is a Bluetooth® network (e.g., a communication scheme that utilizes a communication channel that is defined by a Bluetooth® communication protocol). For example, devices may communicate using a Bluetooth® network (or a Bluetooth® communication channel), which may be associated with lower power consumption as compared to communicating via a WLAN.

To receive messages using the low-power network, the mobile device 110 may tune the transceiver 116 (or a receiver of the transceiver 116) to receive messages using a low-power network (e.g., to scan for one or more messages advertising one or more access points). For example, the mobile device 110 may adjust a receive frequency of the transceiver 116 from a WLAN receive frequency to a NAN receive frequency or to a Bluetooth® receive frequency. As illustrative examples, the mobile device 110 may tune the transceiver 116 to receive messages using a channel specified by a communication protocol, such as Channel 6 of a 2.4 gigahertz (GHz) NAN network or Channel 44 or 149 (depending on local regulations) of a 5 GHz NAN network. It is noted that in other implementations, the mobile device 110 may use multiple transceivers instead of a single transceiver. In this case, another transceiver of the mobile device 110 (other than the transceiver 116) may be tuned to receive messages using the low-power network.

The mobile device 110 may receive a message 126 sent using the low-power network. The message 126 may indicate one or more network parameters 128 associated with the second WLAN. To illustrate, the access point 130 may broadcast (or "publish") the message 126 to "advertise" the second WLAN to mobile devices, such as the mobile device 110. The one or more network parameters 128 may include a network channel (e.g., uplink frequency and/or downlink frequency) associated with the second WLAN, a target beacon transmit time (TBTT) associated with the second WLAN, a service set identification (SSID) associated with the second WLAN, or a combination thereof, as illustrative examples. In some cases, a mobile device may "republish" the message 126 to further advertise the second WLAN. For example, the mobile device 140 may receive the message 126 and may republish the message 126 to advertise the second WLAN (e.g., to "extend" the range of the message 126 so that the message 126 is received by more devices). In this example, the mobile device 110 may receive the message 126 from the mobile device 140. Thus, although the low-power network may have a smaller coverage area than the second WLAN (e.g., due to lower power of transmitted signals), a device that is within the second coverage area 124 but that is outside the low-power network coverage area may be enabled to detect the second WLAN by receiving the message 126 from the mobile device 140.

In other cases, republishing of the message 126 in the communication system 100 can be avoided (e.g., suppressed). For example, avoiding republishing of the message 126 may avoid instances of the communication system 100 being "flooded" with messages (e.g., service discovery messages or other advertisements). In this example, the access point 130 may send the message 126, and the message 126 may include a "do not republish" indication that indicates the message 126 is not to be republished.

In certain implementations, the mobile device 110 is configured to receive messages (e.g., the message 126) during one or more intervals (or windows) associated with a communication protocol. For example, the mobile device 110 may receive the message 126 during a discovery window associated with a communication protocol. To illustrate, time intervals in a NAN may be divided into timer units (TU), where one TU is equal to 1024 microseconds. Devices participating in the NAN (e.g., the mobile device 110) may wake up during a 16 TU discovery window that occurs every 500 TU (or approximately each half-second). In this example, the mobile device 110 may periodically or occasionally wake up (if asleep) during the discovery window associated with the NAN to receive one or more messages, such as the message 126.

In response to receiving the message 126, the mobile device 110 may use the one or more network parameters 128 to determine whether to communicate with the access point 130 (e.g., whether to perform a link setup procedure with the access point 130). For example, the mobile device 110 may be configured to communicate only with certain access points, such as access points affiliated with a common network or service provider of the mobile device 110. In this example, the mobile device 110 may determine based on the one or more network parameters 128 whether the mobile device 110 and the access point 130 are associated with a common network or service provider. For example, the one or more network parameters 128 may indicate a security domain associated with the access point 130 and/or an IP subnet associated with the access point 130. In some implementations, the mobile device 110 may be configured to compare the security domain and/or the IP subnet with an indication of a security domain and/or an IP subnet of the mobile device 110 (e.g., to determine whether the security domains and/or IP subnets match).

In a particular example, the message 126 is sent via the low-power network in accordance with an IEEE 802.11ai technique. For example, the one or more network parameters 128 may include an IEEE 802.11ai FILS information element (IE). The IEEE 802.11ai FILS information element may indicate a security domain associated with the access point 130, an IP address type associated with the access point 130, or an IP subnet associated with the access point 130. Depending on the particular implementation, the IEEE 802.11ai FILS information element may indicate multiple security domains (e.g., six security domains, or another number of security domains). In a particular embodiment, the IEEE 802.11ai FILS information element includes a two-byte hash of a security domain. It is noted that in this example, an IEEE 802.11ai FILS information element may be sent via a low-power network (e.g., a NAN or a Bluetooth® network) instead of using a WLAN (e.g., instead of including the IEEE 802.11ai FILS information element in a beacon or in a probe response that is sent using the second WLAN associated with the access point 130).

In a particular embodiment, the mobile device 110 may use an indication of a security domain included in the one or more network parameters 128 or an indication of an IP subnet included in the one or more network parameters 128 to determine which of multiple access points with which to communicate. To illustrate, if the mobile device 110 receives another discovery message including information related to another access point (not shown in FIG. 1) in addition to receiving the message 126, the mobile device 110 may compare IP subnets indicated by the message 126 and the other message to an IP subnet associated with the access point 102. In this example, if the IP subnet of the access point 130 matches the IP subnet of the access point 102, the mobile device 110 may "prefer" to communicate with the access point 130 instead of the other access point, since for example the mobile device 110 may be able to avoid obtaining a new Internet Protocol (IP) address in the case of a common IP subnet (e.g., by selecting the access point 130 for communications instead of selecting the other access point).

In some implementations, the low-power network is a NAN, and the message 126 has a NAN format. For example, the message 126 may be a NAN frame having a NAN frame format (e.g., a specified number of fields, types of the fields, and lengths of the fields). In a particular embodiment, the message 126 is a NAN frame that includes connectivity information (in addition to service information typically advertised by a NAN frame). In this example, the message 126 may include a NAN WLAN connectivity attribute that indicates the one or more network parameters 128. A NAN frame may include a device role field. The device role field may specify if a device sending the message 126 is the publisher of the message 126. For example, the device role field may include a first value (e.g., "1") if the device sending the message 126 is the publisher of the message 126 (e.g., if the access point 130 sends the message 126). The device role field may include a second value (e.g., "0") if another device sends the message 126 (e.g., if the mobile device 140 republishes the message 126, or if another access point republishes the message 126).

In some implementations, the message 126 is a public action frame, such as a service discovery frame. A public action frame may be sent between devices prior to an association procedure between the devices or may be sent between devices that are not associated with a common basic service set (BSS). If the message 126 is a public action frame, the one or more network parameters 128 may be included in or appended to the public action frame, such as in a further discovery attribute field of the public action frame.

The one or more network parameters 128 may include one or more access network query protocol (ANQP) parameters. Although ANQP parameters are typically transmitted in response to a query from a mobile device, the access point 130 may advertise (or broadcast) the one or more ANQP parameters using the message 126, which may enable the mobile device 110 to avoid sending requests for the one or more ANQP parameters. An example sequence of operations within a NAN is provided for illustration and context. In some NAN scenarios, an access point may advertise services using the NAN by publishing information during a discovery window (DW) (e.g., by sending a discovery message during the DW via the NAN). A client device may discover the access point by detecting the discovery message. The client device may use information of the discovery message to determine whether to communicate with the access point (e.g., to determine whether to "subscribe" to one or more services of the access point). If the client device determines to communicate with the access point, the client device may send a subscribe message to the access point. One or more additional follow-up messages may be exchanged between the access point and the client device (e.g., query and response messages) to communicate additional information between the access point and the client device. To illustrate, the client device may send an ANQP Query List element (as specified in IEEE 802.11-2012 section 8.4.4.2) to the access point, and the access point may respond with a Capabilities List ANQP element (as specified in IEEE 802.11-2012 section 8.4.4.3). In some other implementations, the client device may send a Query AP-List ANQP element (as specified in in IEEE 802.11ai), and the access point may respond with an AP-List Response ANQP element (as specified in IEEE 802.11ai).

In connection with the present disclosure, one or more ANQP parameters may be advertised by the access point 130 in response to receiving a query from the mobile device 110 (after the mobile device 110 receives the message 126). For example, the mobile device 110 may send a NAN follow-up message to the access point 130 in response to receiving the message 126 in order to obtain additional information regarding the second WLAN. An example of a NAN follow-up message is a request for additional service information sent from a "subscriber" of the service to a "publisher" of the service (e.g., from the mobile device 110 to the access point 130) in response to receiving a service discovery message (e.g., in response to receiving the message 126). The access point 130 may respond to the NAN follow-up message by sending a NAN follow-up response to the mobile device 110. The NAN follow-up response may indicate information identified by the NAN follow-up message.

In some implementations, one or more IEEE 802.11ai FILS ANQP elements may be "piggybacked" to a NAN message (e.g., a NAN publish message, a NAN subscribe message, or a NAN follow-up message). For example, one or more IEEE 802.11ai FILS ANQP query elements may be piggybacked to a NAN follow-up message sent from the mobile device 110 to the access point 130. As another example, one or more IEEE 802.11ai FILS ANQP response elements may be piggybacked to a NAN follow-up response sent from the access point 130 to the mobile device 110 in response to the NAN follow-up message. In some cases, the message 126 is a NAN message, and the one or more network parameters 128 include one or more IEEE 802.11ai FILS ANQP elements.

Although certain examples have been described with reference to a NAN, it should be appreciated that another network or communication technique may be selected for transmission of the message 126. For example, the access point 130 may send the message 126 using a Bluetooth® network, such as using a Bluetooth® channel (e.g., communication frequency), a frame format associated with a Bluetooth® communication technique, and/or using a Bluetooth® low energy (Bluetooth LE) communication technique. In this case, the message 126 may be a Bluetooth® packet. Further, it is noted that in such an implementation the mobile device 110 and the access point 130 may include Bluetooth® transceivers to enable Bluetooth® communication. In this example, the mobile device 110 may disable the transceiver 116 (or put the transceiver 116 in a low-power state) while the mobile device 110 scans for messages using the Bluetooth® transceiver. For example, the mobile device 110 may disable the transceiver 116 (or put the transceiver 116 in a low-power state) in response to leaving the first coverage area 122.

The mobile device 110 may determine based on the one or more network parameters 128 whether to communicate with the access point 130. If the mobile device 110 determines not to communicate with the access point 130, the mobile device 110 may scan for one or more other access points. For example, the mobile device 110 may continue operating the transceiver 116 using a receive frequency associated with either a NAN or a Bluetooth® network to attempt to identify one or more other access points within range of the mobile device 110.

If the mobile device 110 determines to communicate with the access point 130, the mobile device 110 may initiate a setup procedure with the access point 130. For example, the setup procedure may be an IEEE 802.11ai FILS setup procedure. The setup procedure may include authentication operations and/or association operations. The setup procedure may establish data connectivity between the mobile device 110 and the access point 130. For example, after completing the setup procedure, the mobile device may upload data to a server using an Internet connection of the access point 130, download data from a server using an Internet connection of the access point 130, or a combination thereof.

In some implementations, multiple access points may "cooperate." For example, an access point may receive one or more messages sent by one or more other access points to "learn" about the one or more other access points. As an illustrative example, the access point 102 may receive one or more messages sent by the access point 130, such as by receiving the message 126 to "learn" the one or more network parameters 128. In some cases, the access point 102 may advertise the one or more network parameters 128 on behalf of the access point 102. To further illustrate, the access points 102, 130 may "take turns" advertising the network parameters 111, 128. In this case, a single message sent by one of the access points 102, 130 may indicate the network parameters 111, 128. In this case, one access point may "advertise" another access point.

Alternatively or in addition to advertising another access point, an access point may advertise a particular service offered by another device. For example, the access point 102 may advertise a service offered by a device or server (e.g., a music streaming service offered by a device or a server that is connected to a backhaul network (e.g., the Internet or an Ethernet) associated with the access point 102) alternatively or in addition to advertising the first WLAN. In this example, the message 109 may indicate one or more attributes of a service offered by another device (alternatively or in addition to the one or more network parameters 111), and the mobile device 110 may query the access point 102 to receive additional information related to the service offered by the other device (e.g., to determine an IP address or a streaming rate associated with the other device, as illustrative examples).

In some implementations, one or more devices may operate as a "proxy" for one or more other devices. For example, a provider of a service may "register" with a proxy (e.g., using one or more NAN communications) to cause the proxy to advertise the service to one or more other devices. As an example, the access point 102 may register with a proxy to "offload" certain NAN operations to the proxy (e.g., so that the access point 102 communicates less using a NAN channel and communicates more using an operating channel of the first WLAN, which may reduce "overhead" associated with switching channels). For example, a NAN may use a particular channel (e.g., channel 6 in a 2.4 GHz band or channel 149 in a 5 GHz band), and the access point 102 may use another channel (e.g., a primary channel) to communicate using the first WLAN. In some examples, to advertise the WLAN using the NAN, the access point 102 may switch to the NAN channel (e.g., by tuning the transceiver 108) for each discovery window (e.g., every 512 milliseconds (ms)) associated with the NAN and may stay on the NAN channel for 16 ms. In this example, the access point 102 is unavailable for communications using the primary channel every 512 ms (for 16 ms). Thus, "offloading" the NAN communications to the proxy may free the access point 102 to communicate using the first WLAN.

As another example, if the access point 102 is to initiate a sleep or hibernate mode of operation, the access point 102 may register with a proxy, and the proxy may advertise a service of the access point 102 (e.g., using a low-power network). The proxy may correspond to the mobile device 110, the mobile device 140, the access point 130, or another device. Depending on the particular implementation, a subscriber may query either the access point 102 (if the access point 102 is awake) or the proxy in order to obtain additional information regarding the service (e.g., to "follow up" regarding the service).

In some cases, after registering a service (and attributes related to the service) with a proxy device, an access point (e.g., the access point 102) may switch to the NAN channel for some discovery windows (but not all discovery windows) associated with the NAN. For example, the access point 102 may "monitor" the proxy to confirm the proxy is advertising the service on behalf of the access point 102. In some cases, the proxy may fail to advertise the service, such as if the proxy leaves communication range of the access point 102 or if the proxy powers off. In this case, the access point 102 may search for a "replacement" proxy (e.g., using the NAN). Alternatively or in addition, the access point 102 may switch to the NAN for advertising during each discovery window (e.g., until the access point 102 locates a "replacement" proxy).

The examples of FIG. 1 illustrate a method of obtaining access to a network that reduces power consumption by a mobile device. For example, the mobile device 110 may consume less power using the low-power network to communicate with the access point 130 as compared to using the second WLAN to communicate with the access point 130. Thus, battery life of the mobile device 110 may be conserved.

Figure 2:
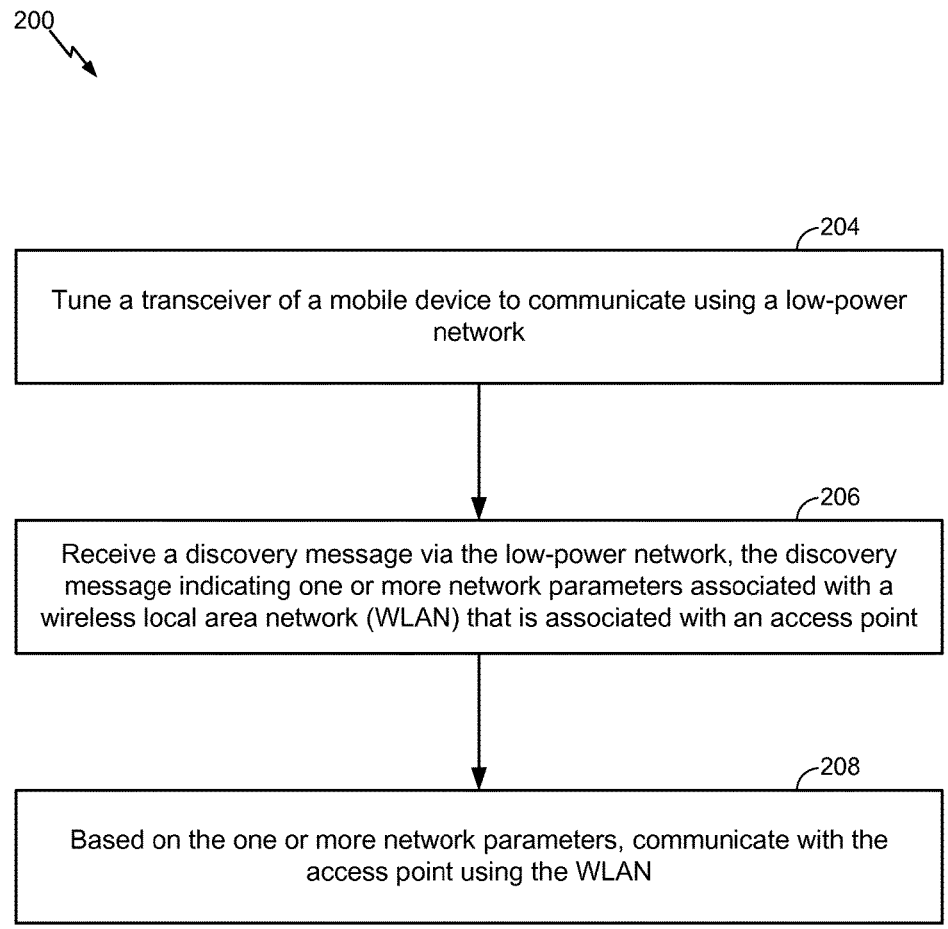
FIG. 2 is a block diagram of a particular illustrative example of a method of operation of a mobile device.

FIG. 2 is a flow diagram of an illustrative method 200 of operation of a mobile device. The mobile device may correspond to the mobile device 110 of FIG. 1.

The method 200 includes tuning a transceiver of the mobile device to communicate using a low-power network, at 204. For example, the transceiver may correspond to the transceiver 116. The low-power network may be a NAN or a Bluetooth® network, as illustrative examples.

The method 200 further includes receiving a discovery message via the low-power network, at 206. The discovery message indicates one or more network parameters associated with a WLAN that is associated with an access point. For example, the discovery message may correspond to the message 109, the one or more network parameters may correspond to the one or more network parameters 111, and the WLAN may correspond to the first WLAN described with reference to FIG. 1. As another example, the discovery message may correspond to the message 126, the one or more network parameters may correspond to the one or more network parameters 128, and the WLAN may correspond to the second WLAN described with reference to FIG. 1. The one or more network parameters may indicate a network channel associated with the WLAN, a TBTT associated with the WLAN, a SSID associated with the WLAN, or a combination thereof, as illustrative examples. In some cases, the discovery message may be received from an access point, such as the access point 102 or the access point 130 of FIG. 1. In other examples, the discovery message may be received from another mobile device, such as the mobile device 140 of FIG. 1 (e.g., after the mobile device 140 "republishes" the message 126).

The method 200 further includes communicating with the access point using the WLAN based on the one or more network parameters, at 208. For example, the mobile device may switch communication from a cellular radio tower (or from another access point) to the access point, and the mobile device may perform a data download or a data upload using the WLAN of the access point.

In some implementations, the low-power network is a neighborhood-area network (NAN). In this case, the method 200 may further include sending a query (e.g., a NAN follow-up message) via the NAN to the access point. The method 200 may also include receiving a response (e.g., a NAN follow-up response) to the query from the access point. The response may indicate one or more additional network parameters associated with the WLAN. To illustrate, the query may request additional information related to the WLAN not included in the discovery message. Depending on the particular implementation, the additional information may indicate a network channel of the WLAN, a target beacon transmit time (TBTT) of the WLAN, a service set identification (SSID) of the access point, a security domain of the access point, an IP subnet of the access point, and/or another parameter. The response may indicate the additional information.

In some implementations, one or more communications between the mobile device and the access point comply with an Institute of Electrical and Electronics Engineers (IEEE) 802.11ai fast initial link setup (FILS) communication protocol. For example, the discovery message may include an IEEE 802.11ai FILS indication element (or information element (IE)) indicating one or more of a security domain of the access point, an IP address type associated with the access point, or an IP subnet of the access point.

In some implementations, one or more communications between the mobile device and the access point utilize one or more query messages. For example, the method 200 may optionally include sending and receiving ANQP information with the access point. In some implementations, the ANQP messages are grouped within a single message (e.g., multiple ANQP messages may be "consolidated" into a single message). For example, if the mobile device 110 is to query the access points 102, 130 (e.g., to "follow-up" regarding the messages 109, 126), the mobile device 110 may group a first query (e.g., for the access point 102) and a second query (e.g., for the access point 130) into a single message and may send the single message to one of the access points, such as the access point 102. The access point 102 may forward the second query to the access point 130 (e.g., using a wired connection, such as the Internet).

The ANQP messages may comply with an Institute of Electrical and Electronics Engineers (IEEE) 802.11-2012 communication specification (e.g., section 8.4.4 of the IEEE 802.11-2012 communication specification and/or another section of the IEEE 802.11-2012 communication specification). In a particular illustrative embodiment, the ANQP messages are sent using an IEEE 802.11 FILS technique. For example, sending and receiving the ANQP messages may include sending an IEEE 802.11ai FILS access network query protocol (ANQP) message to the access point and receiving a reply to the IEEE 802.11 FILS ANQP message indicating additional information related to the WLAN (e.g., additional information not included in the discovery message, such as any of the additional information described above with reference to the NAN follow-up message).

In some cases, the mobile device tunes the transceiver in connection with a roaming operation by the mobile device. To further illustrate, the mobile device 110 may tune the transceiver 116 to communicate using the low-power network in response to terminating communications with the access point 102 or in response to a signal strength (e.g., signal-to-noise ratio (SNR)) associated with communications from the access point 102 failing to satisfy a threshold signal strength. Communications with the access point 102 may be terminated in response to the mobile device 110 exiting a coverage area associated with the access point 102, such as the first coverage area 122. In other cases, the mobile device 110 may tune the transceiver 108 to communicate using the low-power network while the mobile device 110 is located within the first coverage area 122. For example, the mobile device 110 may attempt to "roam" to another access point, such as an access point that is associated with a service provider of the mobile device 110, while the mobile device 110 is located in the first coverage area 122. Alternatively or in addition, the mobile device 110 may tune to a particular channel at a particular time. For example, the mobile device 110 may tune the transceiver 116 to receive one or more messages using the NAN at a particular time, and the mobile device 110 may re-tune the transceiver 116 to communicate using another network (e.g., a WLAN) after receiving one or more messages using the NAN.

The method 200 may reduce power consumption by the mobile device. For example, receiving the message that includes information related to the second access point using the low-power network results in a lower power consumption by the mobile device as compared to communicating with the second access point using the second WLAN. Thus, battery life of the mobile device may be increased.

Figure 3:
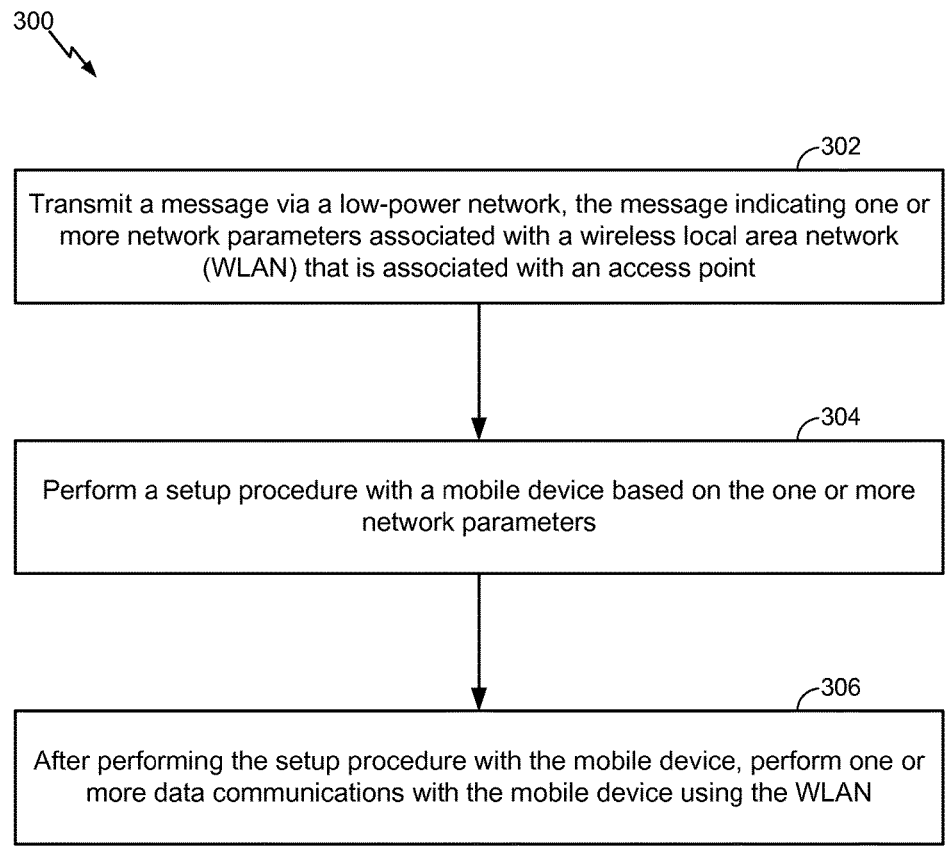
FIG. 3 is a block diagram of a particular illustrative example of a method of operation of an access point.

FIG. 3 is a flow diagram of an illustrative method 300 of operation of an access point. For example, the access point may correspond to the access point 102 or the access point 130 of FIG. 1.

The method 300 includes transmitting a message via a low-power network, at 302. The message indicates one or more network parameters associated with a WLAN that is associated with the access point. For example, the message may correspond to the message 126, the one or more network parameters may correspond to the one or more network parameters 128, and the WLAN may correspond to the second WLAN described with reference to FIG. 1. The one or more network parameters may indicate a network channel associated with the second WLAN, a TBTT associated with the second WLAN, a SSID associated with the second WLAN, or a combination thereof, as illustrative examples.

The method 300 further includes performing a setup procedure with a mobile device based on the one or more network parameters, at 304. For example, the setup procedure may be an IEEE 802.11ai FILS setup procedure. The mobile device may initiate the setup procedure in response to receiving the message from the access point. For example, in some cases, the mobile device 110 of FIG. 1 may receive the message 126 directly from the access point 130. In other cases, the mobile device may initiate the setup procedure in response to receiving the message from another mobile device that "republishes" the message (e.g., using a NAN). For example, the mobile device 140 of FIG. 1 may republish the message 126, and the mobile device 110 may receive the message 126 from the mobile device 140.

The method 300 further includes performing one or more data communications with the mobile device using the WLAN after performing the setup procedure with the mobile device, at 306. To illustrate, the one or more data communications may include a data download operation, a data upload operation, or a combination thereof.

The method 300 may reduce power consumption by the access point. For example, sending the message using the low-power network results in a lower power consumption by the access point as compared to communicating with the mobile device using the second WLAN. Thus, power consumption by the access point may be decreased.

Figure 4:
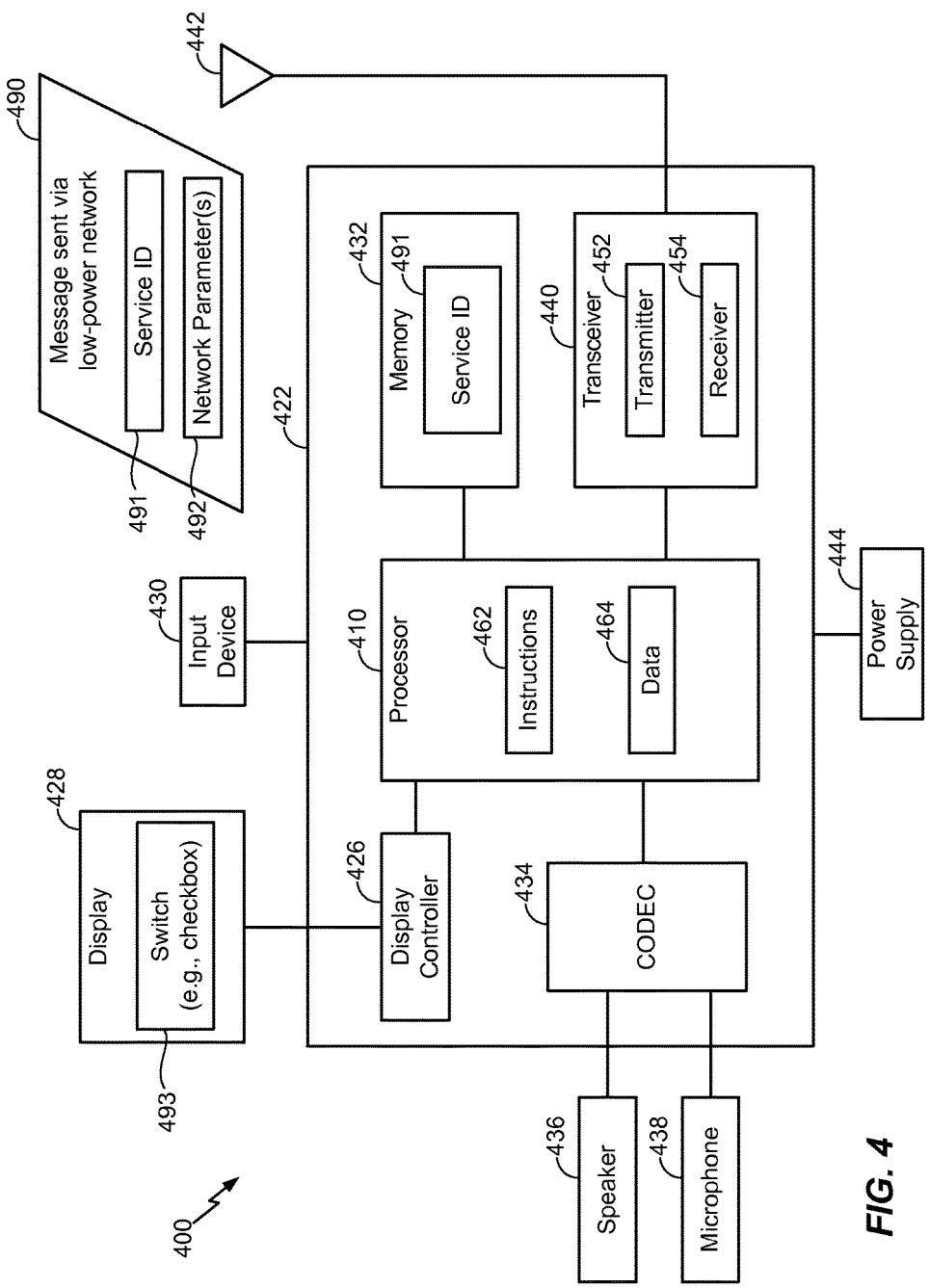
FIG. 4 is a block diagram of a particular illustrative example of a mobile device.

Referring to FIG. 4, a block diagram of a particular illustrative example of a device is depicted and generally designated 400. In a particular embodiment, the device 400 corresponds to a mobile device, such as the mobile device 110 of FIG. 1. Alternatively or in addition, one or more aspects described with reference to the device 400 may correspond to one or more aspects of an access point, such as the access point 102, the access point 130, or both.

The device 400 includes a processor 410, such as a digital signal processor (DSP). The processor 410 may be coupled to a memory, such as to a memory 432. The processor 410 may read and store instructions 462 and/or data 464 at the memory 432. For example, the processor 410 may store the instructions 462 and/or the data 464 at the memory 432. As another example, the processor 410 may access the instructions 462 and/or the data 464 from the memory 432. The instructions 462 may be executable by the processor 410 to perform or initiate one or more operations described herein.

For example, the instructions 462 may be executable by the processor 410 to process information indicated by a message 490 sent via a low-power network. To illustrate, the message 490 may correspond to the message 109 or the message 126 of FIG. 1. The message 490 may indicate a service ID 491, such as the service ID described with reference to FIG. 1. Alternatively or in addition, the message 490 may indicate one or more network parameters 492 (e.g., any of the network parameters 111, 128 of FIG. 1). In this example, the processor 410 may parse the message 490 to identify the service ID 491 and the one or more network parameters 492. In some cases, the processor 410 may store (e.g., cache) the service ID 491 or any of the one or more network parameters 492 at the memory 432 (e.g., to enable later retrieval of the service ID 491 or any of the one or more network parameters 492). In other cases, the service ID 491 may be "known" to the device 400 (e.g., prior to receiving the message 490). For example, the service ID 491 may be associated with a particular communication protocol and may be indicated by (e.g., supplied to the device 400 by) a manufacturer of the device 400 or by a service provider of a network associated with the device 400, as illustrative examples.

FIG. 4 also shows a display controller 426 that is coupled to the processor 410 and to a display 428. A coder/decoder (CODEC) 434 can also be coupled to the processor 410. A speaker 436 and a microphone 438 can be coupled to the CODEC 434. FIG. 4 further indicates that the processor 410 may be further coupled to an antenna 442 via one or more radio devices, such as a transceiver 440.

The transceiver 440 may include a transmitter 452 and a receiver 454. For example, the transmitter 452 and the receiver 454 may be integrated within a transceiver that is configured to send and receive signals using the antenna 442. Although the example of FIG. 4 depicts one transceiver having one transmitter and one receiver, it should be appreciated that a device may include multiple transceivers, transmitters, and/or receivers. For example, in a particular implementation, the device 400 may include a dedicated WLAN (or Wi-Fi) transceiver and one or more dedicated low-power network transceivers, such as a dedicated NAN transceiver and/or a dedicated Bluetooth® receiver.

In a particular embodiment, the processor 410, the display controller 426, the memory 432, the CODEC 434, and the transceiver 440 are included in a system-in-package or system-on-chip device 422. In a particular embodiment, an input device 430 and a power supply 444 are coupled to the system-on-chip device 422. Moreover, in a particular embodiment, as illustrated in FIG. 4, the display 428, the input device 430, the speaker 436, the microphone 438, the antenna 442, and the power supply 444, are external to the system-on-chip device 422. However, each of the display 428, the input device 430, the speaker 436, the microphone 438, the antenna 442, and the power supply 444 can be coupled to a component of the system-on-chip device 422, such as to an interface or to a controller.

During operation, the device 400 may present a user interface, such as a graphical user interface (GUI) using the display 428. The user interface may be configured to display a selectable option associated with a switch 493 (e.g., a checkbox displayed via the GUI). The user interface may be configured to receive input (e.g., text, touchscreen information, sound, or other input) enabling the switch 493. Activation of the switch 493 (e.g., "checking" of the checkbox) may indicate that the device 400 is to search for Wi-Fi networks using low-power networks (e.g., using a NAN, a Bluetooth® network, or a BLE network), such as Wi-Fi networks associated with the service ID 491.

Depending on the particular example, searching for Wi-Fi networks using low-power networks (e.g., in response to activation of the switch 493) may be performed alternatively or in addition to searching for Wi-Fi networks using Wi-Fi channels. For example, as described with reference to FIG. 1, a "low-power" search may be performed in some cases, and a "standard" search may be performed in other cases (e.g., based on a battery charge of the power supply 444).

The processor 410 may be configured to cause the transceiver 440 to tune to a particular channel (e.g., a channel of a low-power network) in response to activation of the switch 493. For example, in response to receiving input enabling the switch 493, the processor 410 may tune the transceiver 440 to a particular channel (e.g., a NAN channel, such as channel 6 in a 2.4 GHz band or channel 149 in a 5 GHz band). The device 400 may monitor the particular channel to detect a Wi-Fi network based on the service ID 491 (e.g., to detect the access point 102 if the access point 102 sends the message 490). In another example, the device 400 may actively "probe" for a network by sending an indication of the service ID 491 (e.g., using the particular channel) in response to input indicating the switch 493.

In a particular example, an apparatus (e.g., the mobile device 110, the device 400, or both) includes a memory (e.g., the memory 114, the memory 432, or both) storing instructions (e.g., the instructions 462) and a processor (e.g., the processor 112, the processor 410, or both) coupled to the memory. The processor is configured to execute the instructions to initiate or control operations. The operations include tuning a transceiver (e.g., the transceiver 116, the transceiver 440, or both) to communicate using a low-power network. The operations also include receiving a discovery message (e.g., any of the messages 109, 126, and 490) via the low-power network. The discovery message indicates one or more network parameters (e.g., any of the network parameters 111, 128, and 492) associated with a WLAN that is associated with an access point (e.g., the access point 102, the access point 130, or both). The operations further include communicating with the access point using the WLAN based on the one or more network parameters.

In another example, an apparatus (e.g., the access point 102, the access point 130, or both) includes a memory (e.g., the memory 106, the memory 134, or both) storing instructions and a processor (e.g., the processor 104, the processor 132, or both) coupled to the memory. The processor is configured to execute the instructions to initiate or control operations. The operations include transmitting a message (e.g., the message 109, the message 126, or both) via a low-power network. The message indicates one or more network parameters (e.g., any of the network parameters 111, 128, and 492) associated with a WLAN. The operations further include performing a setup procedure with a mobile device (e.g., the mobile device 110, the device 400, or both) based on the one or more network parameters and communicating with the mobile device (e.g., by performing one or more data communications with the mobile device) using the WLAN after performing the setup procedure with the mobile device.

The foregoing disclosed devices and functionalities may be designed and configured into computer files (e.g. RTL, GDSII, GERBER, etc.) stored on computer readable media. Some or all such files may be provided to fabrication handlers who fabricate devices based on such files. Resulting products include semiconductor wafers that are then cut into semiconductor die and packaged into semiconductor chips. The chips are then employed in devices described above (e.g., within the device 400).

Those of skill would further appreciate that the various illustrative logical blocks, configurations, modules, circuits, and algorithm steps described in connection with the embodiments disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein (e.g., one or more operations of the methods 200, 300) may be embodied directly in hardware, in a software module executed by a processor, or in a combination of the two. A software module may reside in random access memory (RAM), magnetoresistive random access memory (MRAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal.

In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method of operation of a mobile device, the method comprising:
   tuning a transceiver of the mobile device to communicate using a neighborhood aware network (NAN), the NAN associated with periodic discovery windows;
   receiving a discovery message at the mobile device via the NAN, the discovery message indicating network parameters associated with a wireless local area network (WLAN) that is associated with an access point, wherein the network parameters include a network channel associated with the WLAN, and wherein the network parameters further indicate a target beacon transmit time (TBTT) associated with the WLAN; and
   based on the network parameters, communicating with the access point using the WLAN.

2. The method of claim 1, further comprising:
   sending a query via the NAN to the access point; and
   receiving a response to the query from the access point, the response indicating one or more additional network parameters associated with the WLAN.

3. The method of claim 1, wherein the discovery message indicates a security domain of the access point or an Internet Protocol (IP) subnet of the access point.

4. The method of claim 3, wherein the discovery message includes an Institute of Electrical and Electronics Engineers (IEEE) 802.11ai fast initial link setup (FILS) indication element indicating the security domain or the IP subnet.

5. The method of claim 1, further comprising sending a plurality of access network query protocol (ANQP) messages to the access point, wherein the ANQP messages are grouped within a single message to the access point.

6. The method of claim 5, wherein the ANQP messages comply with an Institute of Electrical and Electronics Engineers (IEEE) 802.11-2012 communication specification.

7. The method of claim 5, wherein sending the ANQP messages includes sending an Institute of Electrical and Electronics Engineers (IEEE) 802.11ai fast initial link setup (FILS) access network query protocol (ANQP) message to the access point, and further comprising receiving a reply to the IEEE 802.11 FILS ANQP message indicating additional information related to the WLAN.

8. The method of claim 1, wherein the access point is an advertiser of a service.

9. The method of claim 8, wherein the mobile device is a subscriber of the service.

10. An apparatus comprising:
    a memory storing instructions; and
    a processor coupled to the memory, the processor configured to execute the instructions to perform operations including:
    tuning a transceiver to communicate using a neighborhood aware network (NAN), the NAN associated with periodic discovery windows;
    receiving a discovery message via the NAN, the discovery message indicating network parameters associated with a wireless local area network (WLAN) that is associated with an access point, wherein the network parameters indicate a network channel associated with the WLAN, and wherein the network parameters further indicate a target beacon transmit time (TBTT) associated with the WLAN; and
    communicating with the access point using the WLAN based on the network parameters.

11. The apparatus of claim 10, wherein the discovery message includes a service identification (ID) that identifies the WLAN.

12. The apparatus of claim 11, wherein the WLAN complies with a communication protocol, and wherein the service ID matches a particular service ID specified by the communication protocol.

13. The apparatus of claim 12, wherein the communication protocol is a Wi-Fi Alliance communication protocol or an Institute of Electrical and Electronics Engineers (IEEE) 802.11 communication protocol.

14. The apparatus of claim 11, wherein the service ID matches a particular service ID specified by a manufacturer of a mobile device or by a service provider of a network associated with the mobile device.

15. The apparatus of claim 10, further comprising a user interface configured to display a selectable option associated with a switch.

16. The apparatus of claim 15, further comprising the transceiver, wherein the processor is further configured to cause the transceiver to tune to a particular channel associated with the NAN to detect the discovery message in response to activation of the switch.

17. An apparatus comprising:
    means for receiving a discovery message via a neighborhood aware network (NAN), the discovery message indicating network parameters associated with a wireless local area network (WLAN) that is associated with an access point, the NAN associated with periodic discovery windows, wherein the network parameters indicate a network channel associated with the WLAN, and wherein the network parameters further indicate a target beacon transmit time (TBTT) associated with the WLAN; and
    means for initiating communication with the access point via the WLAN based on the network parameters.

18. The apparatus of claim 17, further comprising means for displaying a selectable indicator associated with the NAN.

19. A non-transitory computer-readable medium storing instructions for communication that, when executed by a processor, cause the processor to perform operations including:
    tuning a transceiver of a mobile device to communicate using a neighborhood aware network (NAN), the NAN associated with periodic discovery windows;
    receiving a discovery message at the mobile device via the NAN, the discovery message indicating network parameters associated with a wireless local area network (WLAN) that is associated with an access point, wherein the network parameters indicate a network channel associated with the WLAN, and wherein the network parameters further indicate a target beacon transmit time (TBTT) associated with the WLAN; and initiating communication with the access point using the WLAN based on the network parameters.

20. The non-transitory computer-readable medium of claim 19, wherein the operations further include initiating a setup procedure with the access point prior to initiating the communication with the access point, and wherein the setup procedure includes an authentication operation, an association operation, or both.

21. The non-transitory computer-readable medium of claim 19, wherein the operations further include sending an access network query protocol (ANQP) message to the access point.

22. The method of claim 1, wherein the transceiver is tuned to the NAN during a discovery window of the periodic discovery windows, and wherein the discovery message is received during the discovery window.

23. The method of claim 1, wherein the discovery message comprises a NAN frame that includes a NAN WLAN connectivity attribute.

24. The method of claim 23, wherein the NAN frame further includes an Institute of Electrical and Electronics Engineers (IEEE) 802.11ai fast initial link setup (FILS) indication element indicating at least one of a security domain of the access point or an Internet Protocol (IP) subnet of the access point.

25. The method of claim 1, wherein the discovery message is received from a second access point that operates as a proxy for the access point.

26. The method of claim 1, wherein the transceiver is tuned to the NAN in response to a power level of the mobile device being less than a threshold.

27. The method of claim 1, further comprising:

receiving a second discovery message via the NAN, the second discovery message indicating one or more network parameters associated with a second WLAN that is associated with a second access point; and determining whether to communicate with the access point based on a first security domain associated with the access point and a second security domain associated with the second access point.

28. The method of claim 1, wherein the discovery message comprises a NAN frame that includes an Institute of Electrical and Electronics Engineers (IEEE) 802.11ai fast initial link setup (FILS) indication element indicating at least one of a security domain of the access point or an Internet Protocol (IP) subnet of the access point.

* * * * *